United States Patent Office 2,854,452
Patented Sept. 30, 1958

2,854,452

PROCESS FOR PREPARING 11-OXYGENATED NUCLEAR-SATURATED STEROIDS

Gerald D. Laubach, Jackson Heights, N. Y., assignor to Chas. Pfizer & Co., Inc., Brooklyn, N. Y., a corporation of Delaware No Drawing. Application July 27, 1954
Serial No. 446,159

5 Claims. (Cl. 260—239.55)

This invention is concerned with the selective reduction of steroids to prepare 11-oxygenated nuclear saturated compounds useful in the synthesis of cortisone, compound F and similar cortical hormones.

This application is a continuation-in-part of application Serial No. 276,050, filed on March 11, 1952, and now abandoned.

In the course of synthesizing biologically active materials from certain naturally occurring steroids, especially those from vegetable sources, intermediates are obained which have nuclear double bonds and possess, at least at the 11-position and frequently at C9, either an hydroxyl group or another oxygen function derived from OH, such as a keto group, ester or ether. Retention of the C11 oxygen but removal of nuclear unsaturations and any oxygen function at C9 is greatly desired to obtain valuable therapeutic agents. However, such a highly selective reduction has not been capable of ready achievement. At the same time, also, the 11-oxygenated unsaturated intermediates are generally further oxygenated at C3, and retention of this substituent is important in producing cortisone. U. S. Patent 2,802,014, issued August 6, 1957, teaches how to reduce a C9 oxygen and some but not all of the nuclear double bonds present, without affecting the C11 substituent. However, there has been no way readily to saturate completely the steroid nucleus and leave unattacked the desirable C11 oxygen. Thus, the method of the aforesaid patent selectively hydrogenates a C9-oxygenated group and, say, a 6,7 unsaturation, but does not alter an 8(14) double bond. While the continued presence of the latter is sometimes advantageous, later on in the cortical hormone synthesis its removal or rearrangement is frequently sought.

It is among the objects of this invention to facilitate the synthetic preparation of cortical hormones. A particular object is to saturate the nucleus of an 11-oxygenated unsaturated steroid without affecting the C11-position. Another object is to provide a method for saturating the nucleus and selectively removing the C9 oxygenated substituent in a 9,11-oxygenated nuclear unsaturated steroid. A further object is to hydrogenate the new products of the aforesaid patent, which are 3,11-dioxygenated nuclear unsaturated compounds. Other objects will be apparent from a study of the ensuing description.

These and other objects are realized by the present invention which broadly comprises reacting an 11-oxygenated nuclear unsaturated steroid with hydrogen in the presence of a strong acid and of a noble metal catalyst. Nuclear double bonds are thereby selectively saturated, while the C11 oxygen is, peculiarly enough, not attacked. If the initial steroid is also oxygenated at C9, this function is reduced at the same time, the similar C11 group still, surprisingly, being unaffected. If the steroid reactant, for instance, is unsaturated at 8(14) or at 6,7 and 8(14), these double bonds will be completely reduced by the hydrogenation. If the reactant is 3,9,11-trioxygenated 8(14)-unsaturated, then the new process results in 3,11-dioxygenated nuclear saturated products. The strange selectivity of this novel method is thus clearly shown. A C3 oxygen, and/or a C11 oxygen are untouched by hydrogen, while a C9 oxygen is readily and efficiently removed and nuclear double bonds are fully saturated.

According to certain specific embodiments of this invention, steroids bearing an hydroxyl group or a group readily hydrolyzable to hydroxyl at the 11-position, and unsaturated at least at the 8(14)-position of the nucleus are selectively hydrogenated to yield nuclear saturated 11-oxygenated compounds. The treatment is effected in the presence of a noble metal catalyst, preferably platinum or palladium, and of a strong acid. An inert organic solvent system is used and the hydrogenation proceeds normally at room temperature and atmospheric pressure. The strong acid is generally either a mineral acid or a strong organic acid.

Various other substituents can be present on the steroid nucleus and may or may not be reduced by the hydrogen, without untoward effect on the basic value of the new process. For instance, at C17 there may be an alkenyl group such as occurs in ergosterol and other vegetable-type compounds, or there may be a short oxygenated side chain like those present in cortisone itself and similar biologically active steroids. The 22–23 double bond of the ergosterol type compound is usually reduced under the new hydrogenation conditions, but the critical feature is that the C11 oxygen function will pass unscathed through the treatment.

The reactions outlined above may be more clearly understood by reference to the following formulas, which designate certain preferred reactants and reaction products. I is a 3,9,11-trioxygenated 6,8(14)-nuclear diunsaturated vegetable-type steroid; II represents the corresponding 8(14)-nuclear monounsaturated compound; III is one of the novel 3,11-dioxygenated 8(14)-monounsaturated steroids disclosed and claimed in the aforesaid patent; and IV shows the product obtained by hydrogenation of either I, II or III according to the process of the present invention.

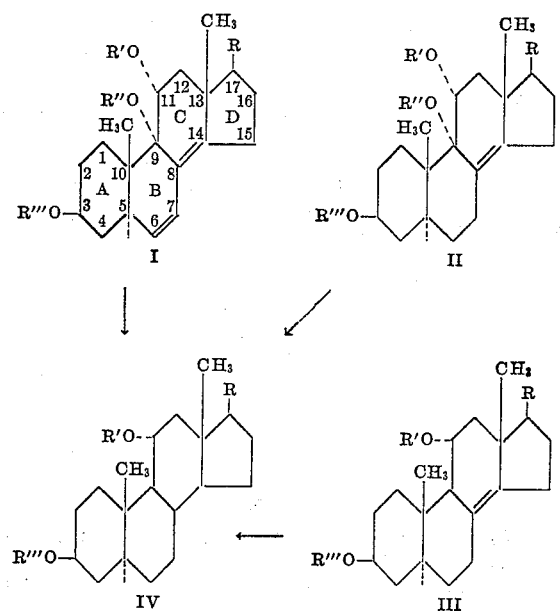

In the above formulas R may be $$CH_3\underset{|}{C}=O, \quad CH_3\underset{|}{CH}-O \text{ acyl}$$

where the acyl group may be, for example, acetyl, propionyl, hexahydrobenzoyl or acid succinyl,

CH₃CHCOOH,

CH₃CHCOOalkyl, where the alkyl group may for example be methyl or ethyl, alkyl, such as methyl or ethyl, alkylene, for example the group $C_9H_{17}$ which occurs in ergosterol

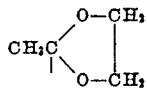

and groups of this nature. R', R" and R''' may be either acyl, such as acetyl or priopionyl, alkyl, such as methyl or ethyl, or hydrogen, and may be alike or different. Particularly useful products are obtained when at least one of the finally retained groups, especially R', is hydrogen. Esterification of such hydroxyl groups may be selectively accomplished by the usual acylating agents, for example acetic anhydride, ketene, benzoyl chloride and so forth. The formulas as written depict a 5,10 trans-configuration, the C5 substituent being invisible beneath the molecule. However, it should be understood that an AB:cis ring juncture may be present instead and such compounds be equally operable in the present process. As aforesaid, the type of steroid represented by III is described in the U. S. patent previously mentioned, while compounds I and II are taught in another U. S. Patent 2,807,632 issued Sepetember 24, 1957.

A specific example of the utility of the process of this invention is in the production of cortisone. For instance, this process is useful in converting such a material as ergosta-6,8(14),22-triene-3,9,11-triol-3-acetate to cortisone. The first step is to convert the 17 position side chain of the starting material to a —COCH₃ group. This is accomplished by treatment with ozone, reductively cleaving the resulting ozonide, treating the aldehyde so obtained with piperidine in mild acid to form an eneamine, and oxidizing the eneamine with CrO₃ to obtain the ketone. The overall result of this is shown by the following formulas:

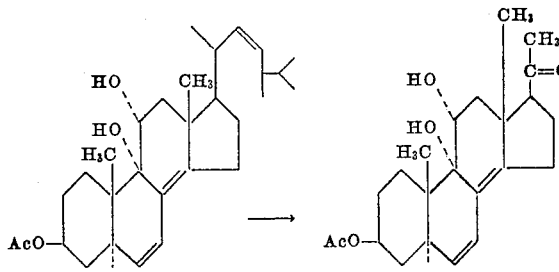

This product is then subjected to the process of the present invention. This results in the formation of the compound allopregnane-3β-11α-diol-20-one - 3 - acetate, shown in the following formula.

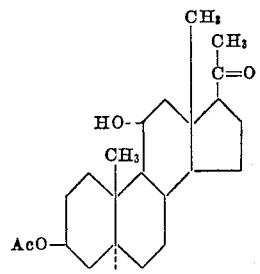

This compound is a known intermediate for the synthesis of cortisone.

In carrying out the new hydrogenation process it is preferred to employ temperatures of from about 15° to about 35° C., although somewhat higher temperatures are not deleterious. Hydrogen pressures of from slightly below about one atmosphere to about ten atmospheres are suitable although temperatures up to about 100° C. and pressures up to about 2,000 p. s. i. may be used. Generally speaking, room temperature and atmospheric pressures are simplest and fully satisfactory. The reduction normally either completely stops or is markedly reduced in rate when the theoretical amount of hydrogen required for attacking the particular reducible groups present has been utilized. The products of the reaction may be isolated with relative ease; preferably, the catalyst is filtered and the solvent removed under vacuum. In many cases the products are obtained at once in crystalline form when the solvent is merely removed thus. In other cases it may be desirable to subject the material to conventional purification procedures, such as crystallization from a second solvent or chromatography.

Various types of noble metals can be employed in the new treatment. Palladium and platinum catalysts are especially good and preferred, but iridium, osmium, rhodium and the like are also operable. The material known as Adams platinum oxide is particularly useful, and palladium-on-charcoal catalysts also are very effective. The proportion of catalyst to reactants may vary widely, but roughly between 10% and 500% by weight of the steroid is generally satisfactory and between about 50% and 100% is a preferred range.

The hydrogenation should be conducted in a liquid system, as hereinbefore mentioned. Depending upon the steroid and strong acid chosen, excellent organic solvents may be ethyl acetate, the lower alcohols, chloroform and other halogenated hydrocarbons, saturated hydrocarbons such as hexane, organic acids, such as acetic acid, and generally any compound which will appreciably dissolve the reactants and yet not itself enter into deleterious side reactions.

Only a minor proportion of the strong acid additive need be present to effectuate the selective hydrogenation treatment. Generally from about 1% to 1,000% by by weight of the steroid is sufficient, and between 1% and 50% is a desirable range. The function of this additive is not exactly understood, but it is believed that it may be concerned with the rearrangement of the 8(14)-double bond to the 14,15-position. In any event its presence is necessary to achieve the peculiar selectivity of this novel reduction. The term "strong" may be taken to mean the inorganic acids generally referred to as "mineral acids" that is, sulfuric acid, perchloric acid, and preferably hydrochloric acid.

The following examples are given by way of illustration and are not to be considered as limitations of this invention. Indeed, as many apparently widely different embodiments of the present invention may be made without departing from the spirit and scope hereof, it is to be understood that this invention is not limited, except as defined in the appended claims.

*Example I*

A solution of 118 mg. (0.00025 mole) of 8(14)-ergostene-3β,9α,11α-triol 3-acetate in 12 ml. of ethyl acetate containing one ml. of concentrated hydrochloric acid was hydrogenated over 0.200 gram of pre-reduced platinum oxide catalyst. After an uptake of 12.2 ml. (102% of 2 moles) of hydrogen, absorption abruptly ceased. The catalyst was removed by filtration and the filtrate washed with water. The combined filtrate and washings on standing were evaporated to dryness, forming a clear oil which crystallized. This was removered and determined by analysis to be the corresponding nuclear saturated 22,23-dihydro-3β,11α-diol 3-acetate steroid, melting point 139–144°.

*Analysis.*—Calcd. for $C_{30}H_{52}O_3$: C, 78.20; H, 11.38. Found: C, 78.32; H, 11.29.

The same reaction was carried out using 0.1 gram of palladium-on-charcoal (5% Pd) catalyst. On chromatography the identical product resulted.

Example II

The procedure of Example I was repeated numerous times, except that in place of the acetyl group present at position 3 in Example I, the free OH group and various ester and ether groups were used. The used esters included the propionate, hemisuccinate and hydrobenzoate, and the ethers included the methyl and ethyl. In all cases the change in the group at the 3 position had no effect on the overall reaction which proceeded as before, and the 3 position group itself came through the reaction unchanged.

What is claimed is:

1. A process for preparing an 11-oxygenated nuclear saturated steroid, which process comprises reacting a steroid selected from the group consisting of

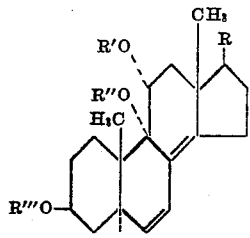

and

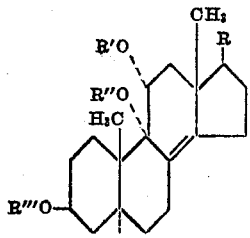

and

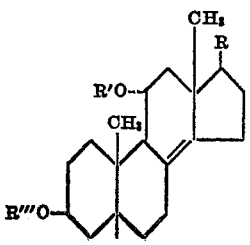

wherein R is selected from the class consisting of

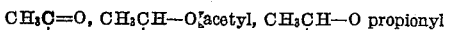
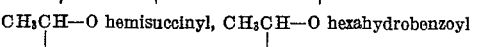

and

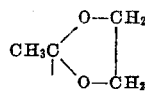

and R', R'' and R''' are selected from the class consisting of acetyl, propionyl, hemisuccinyl, hexahydrobenzoyl and hydrogen, with hydrogen in the presence of a noble metal catalyst and of a strong acid.

2. A process according to claim 1 wherein the reaction is conducted in an inert organic solvent system.

3. A process according to claim 2 wherein the strong acid is a mineral acid.

4. A process according to claim 1 wherein the catalyst is palladium.

5. A process according to claim 1 wherein the catalyst is platinum.

References Cited in the file of this patent

FOREIGN PATENTS 848,797    France _____ July 31, 1939

OTHER REFERENCES

Fieser et al.: Natural Products Related to Phenanthrene, 3rd ed., page 551 (1949).